April 28, 1953 E. H. BLATTNER 2,636,789
SIDE BEARING

Filed July 25, 1949 2 SHEETS—SHEET 1

Inventor:
Emil H. Blattner
By Ernest F. Mechlin
his Attorney

April 28, 1953 E. H. BLATTNER 2,636,789
SIDE BEARING
Filed July 25, 1949 2 SHEETS—SHEET 2

Inventor:
Emil H. Blattner
By Ernest F. Mechlin
his Attorney

Patented Apr. 28, 1953

2,636,789

UNITED STATES PATENT OFFICE 2,636,789

SIDE BEARING

Emil H. Blattner, Buffalo, N. Y., assignor to The Symington-Gould Corporation, Depew, N. Y., a corporation of New York Application July 25, 1949, Serial No. 106,660

18 Claims. (Cl. 308—138)

This invention relates to a side bearing and more particularly to a resilient frictional type thereof adapted for use in a railway vehicle.

An object of the present invention is the provision of an improved resilient and frictional type side bearing arranged to be interposed between a body bolster and truck bolster of a railway vehicle and adapted to cushion or control movements of said bolsters relative to one another.

Another object of this invention is to provide an improved side bearing of compact design and arranged to be instantly responsive and create frictional forces to control relative pivotal movements of mated or related bolsters as well as movements of these bolsters in a vertical direction toward or away from one another.

A further object of the invention is the provision of telescoping caps in a side bearing and being arranged to move vertically in unison and relative to one another horizontally to contact frictionally a housing toward controlling relative movements of related bolsters of a railway vehicle.

The above and numerous other objects of the present invention will become apparent from the succeeding detailed description of an exemplified form of the invention considered together with a form illustrated in the accompanying drawing wherein.

Figure 1:
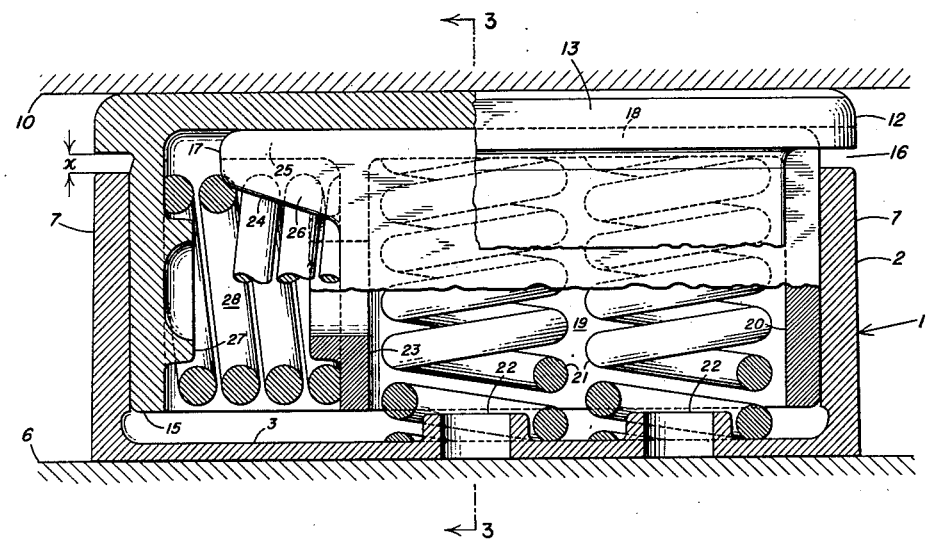
Figure 1 is a partial elevational and partial vertical sectional view of a side bearing embodying the present invention.
Figure 3:
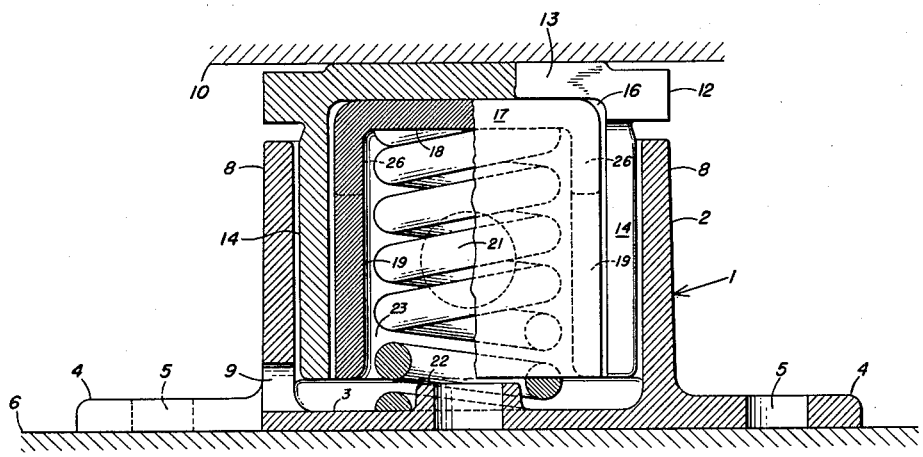
Figure 3 is a partial vertical sectional and partial elevational view of the side bearing shown in Figure 1 and considered partly as looking in the direction of the arrows along line 3—3 thereof.
Figure 2:
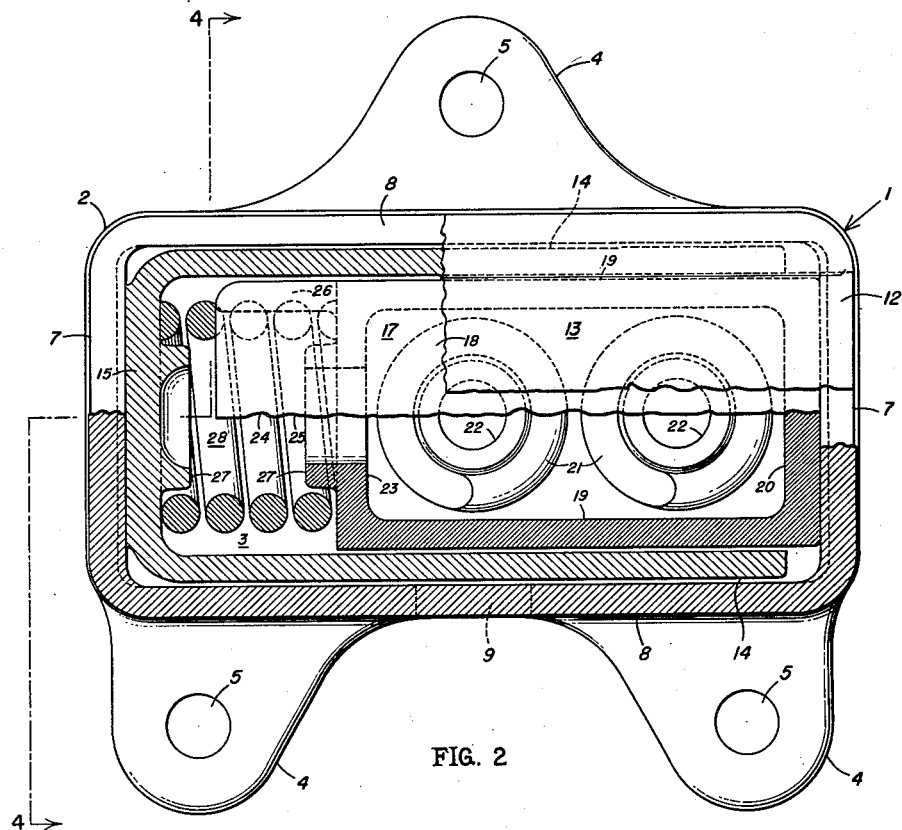
Figure 2 is a partial plan and partial horizontal sectional view of the side bearing shown in Figure 1.
Figure 4:
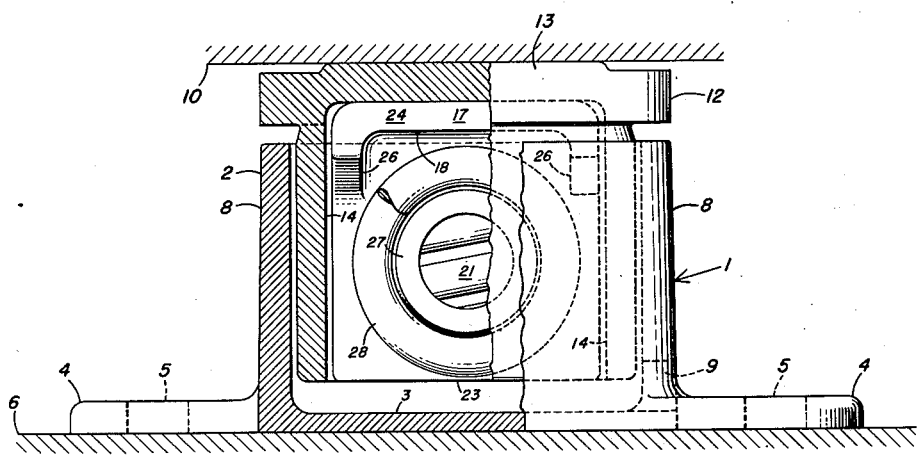
Figure 4 is a partial vertical sectional view and partial elevational view partly taken along the line 4—4 of Figure 1, looking in the direction of the arrows.

Referring now in detail to the various figures of the drawing, wherein like reference characters indicate like parts, the numeral 1 is employed to designate, in a somewhat general manner, a side bearing particularly of the compressible or resilient type and embodying a construction and relation of elements illustrative of the present invention. The side bearing desirably comprises a housing or casing 2 partially hollow in form and having a horizontal bottom or lower plate 3 provided with securing or attaching ears 4 apertured, as at 5, to accommodate rivets, bolts or any other such means (not shown). The bottom plate is adapted to be removably secured to the top portion of the truck bolster only a top surface 6 thereof being indicated diagrammatically. Upstanding from the bottom plate of the housing are longitudinally spaced, substantially vertical end walls 7 which are joined together adjacent their extremities by transversely spaced, vertically extending side walls 8 to define a space therebetween which opens upwardly and forms a confining receptacle for associated elements to be hereinafter described.

Positioned adjacent the lower extremities of one of the side walls is an elongated aperture 9 which assists in lightening the housing and also forms an outlet for the escape of any foreign substance which may find its way into the interior of the side bearing.

As previously stated in the objects set out hereinabove, the side bearing is arranged to be disposed between a truck bolster and a body bolster, the latter of which is indicated in the drawings, Figure 1 particularly, by a lower exposed surface 10. More specifically for a complete understanding of the invention, a side bearing is arranged at or adjacent each end of the bolster and since the bolsters rock in a direction transversely of the truck relative to one another, the instant structure is so arranged and constructed that such rocking action is controlled within certain predetermined or permissible limits. Further, a railway truck bolster is arranged to pivot horizontally about a vertical axis relative to the body bolster and the instant structure is further so arranged and constructed that frictional forces are created on contiguous surfaces of the side bearing and portions of the body bloster to control such pivotal movements.

With the above, therefore, as a clear background of some of the offices of the side bearing of the present invention, there is provided a top or cover cap 12 disposed within the casing and extending thereabove for a predetermined distance. The top cap desirably comprises a top or rubbing plate 13 blanketing or extending entirely over the housing side and end walls and having a horizontal extent preferably equal to outside dimensions of the casing walls to function partly, as a shield to prevent the ingress of foreign substance to the interior of the side bearing. Further the normal distance between the rubbing plate and top edges of the walls indicated by the distance marked "X" in Figure 1 only, is determinative of the permissible compressive movement of the side bearing so that after the rubbing plate contacts the walls, the side bearing will function as a solid unit or block to prevent a further or continued approach of the bolsters and therefore, definitely limit the amount of relative rocking action of the bolsters. Also as the truck bolster pivots relative to the body bolsters, the rubbing plate will pass along the body bolster surface 10 to create frictional forces and thus control such pivotal movements.

Depending from the top cap rubbing plate are intermediate or side flanges 14 extending into the casing but in spaced parallel relation with the housing side walls. This slight distance or clearance between the side walls and intermediate flanges is present to permit the rubbing plate to remain at all times in full surface bearing relation with the body bolster surface 10 and allow some, however slight, degree of flexibility between the housing and top cap. The necessity of the clearance will be appreciated when it is recalled that as the bolsters rock transversely of the car relative to one another, the angle or relative disposition of the surfaces 6 and 10 is continually changing. Further, in connection with these intermediate flanges it is to be noted that they preferably terminate short of the bottom plate by a distance in excess of that indicated at "X" to permit the side bearing to function as intended. Joining adjacent ends of the intermediate flanges is a brushing flange 15 also formed integrally with the top plate and depending therefrom into the casing to an extent substantially equal with the intermediate flanges. It is to be observed that only one brushing flange appears in the top cap and therefore the latter opens downwardly and longitudinally at the other end 16 thereof for purposes to be made hereinafter apparent. The brushing flange is in full surface bearing relation with the adjacent casing end wall so that as the top cap, in response to a breathing action or expansive and compressive movements of the side bearing, moves vertically, frictional forces will be created on the engaging surfaces of these components to assist in controlling such movements.

Positioned within the casing and top cap is an inner or sub-cap 17 which comprises a bed or supporting plate 18 in subjacent relation to the rubbing or top plate. This bed plate is of slightly less width than the distance between the intermediate flange and of a length to function as an adequate support for the top plate so that an appreciable bearing area, between these two plates, will be present at all times. Depending from the transverse limits of the bed plate are spaced, substantially parallel side flanges 19 which preferably terminate in alignment with the bottom edge of the top cap flanges. Joining the side flanges 19 adjacent one end thereof is an end flange 20 coextensive, vertically, with the companion side walls and arranged to engage, frictionally and constantly, a related end wall of the casing. Accordingly, this end flange will, during an expansive or compressive movement of the side bearing, frictionally contact the opposing end wall to also assist in snubbing or controlling such movements.

Since the present structure is of the resilient type it is essential that some yieldable means be incorporated therein to accomplish the end result intended. Accordingly, spring means of any desired type and characterized by a pair of coil springs 21 is disposed in adjacent relation within the confines of the inner cap. In order to maintain the springs in a predetermined position, bosses or lugs 22 are formed on the casing plate to extend within the coil springs and function as centering means. The upper extremities of the coil springs bear directly against the inner cap plate and because the two caps are in nested relation the one set of coil springs function as yieldable or resilient supports for both caps.

Also, in order to insure a somewhat constant degree of friction between the casing end walls and the flanges in engagement therewith, some means should be incorporated in the structure to effect a spreading action of the caps. Toward the accomplishment of the above, the sub-cap is provided with another end flange 23 which, for convenience, will be hereinafter termed an intermediate flange. This intermediate flange joins the sub-cap side flanges and depends from the supporting plate at a location spaced inwardly from an adjacent free end thereof. This arrangement places the intermediate flange an appreciable distance from the opposing brushing flange while forming a hood-like arrangement 24 extending the sub-cap supporting plate as at 25 to underlie a greater distance or area of the rubbing plate with this extension being suitably supported by knee-braces 26 continuing from the sub-cap side flanges.

The intermediate and brushing flanges are provided with knobs or rings 27 facing or extending toward one another to function as centering means for any type of resilient means such as the illustrated coil spring 28. This arrangement will prevent a chucking action of the side bearing caps in that when the side bearing is moved to the right as viewed in Figure 1 no chucking can take place because the flange 15 of the top cap is already in contact with the related end wall and the end flange 20 cannot be displaced from contact relationship with its companion end wall. This last condition is true because of the frictional contact between the inner and outer caps. Augmenting the frictional contact is the pressure of spring 28 to also hold the end flange 20 in contact with the end wall. However, when the side bearing is moved in a direction to the left, still considering the showing of Figure 1, the force tending to separate end wall 15 from its companion wall 7 is the frictional resistance imposed between the body bolster surface 10 and the upper surface of the top cap. This frictional resistance is exceeded by an ample margin by the pressure delivered by spring 28. In addition, the frictional resistance between the engaging surfaces of the inner and outer caps tends to keep these parts from separating. This frictional resistance is of the same magnitude as that between the body bolster surface 10 and the upper surface of the top cap.

Accordingly, from the above it will be noted that various changes and alterations may be made to the structure illustrated in the accompanying drawing without departing from the spirit of the invention and scope of the appended claims.

I claim:

1. In a side bearing, the combination of, a housing, an inner cap within said housing, an outer gap within said housing and carried by said inner cap, said outer cap being arranged to contact frictionally a car body structure, spring means within said inner cap arranged to urge both caps outwardly of said housing, and spring means between and acting against said caps for urging the latter into frictional engagement with said housing.

2. In a side bearing, the combination of, a housing, an inner cap within said housing, an outer cap within said housing and embracing said inner cap, spring means within said inner cap for urging both caps outwardly of said housing, and spring means between and acting against said caps for urging the latter apart into frictional engagement with said housing.

3. In a side bearing, the combination of, a housing, an inner cap within said housing, an outer cap within said housing and projecting therebeyond to present a friction surface for engagement by a related part of a car structure, said outer cap being supported by said inner cap, spring means within said inner cap for urging said caps outwardly of said housing, and spring means between and acting against said caps for urging the latter into frictional engagement with said housing.

4. In a side bearing, the combination of, a housing, a top cap within said housing and having a plate therebeyond to frictionally engage a related part of a railway car, a sub-cap within said top cap and housing and supporting said top cap, spring means within said sub-cap for urging both caps outwardly of said housing, and spring means interposed between and acting against said caps for urging them apart into frictional engagement with said housing.

5. In a side bearing, the combination of, a housing, a top cap within said housing and having a plate thereabove to frictionally engage a related part of a railway car, a sub-cap interposed between said outer cap and housing for supporting said outer cap, spring means within said sub-cap for urging both caps outwardly of said housing, and spring means interposed between and acting against said caps for urging said caps in opposite directions into frictional engagement with said housing.

6. In a side bearing, the combination of, a housing, a top cap within said housing and having a plate portion spaced above said housing for frictionally engaging a related part of a railway car, a sub-cap within said top cap and housing and supporting said top cap, spring means within said housing for urging both caps outwardly of said housing, and spring means within said top cap and urging said caps apart into frictional contact with said housing.

7. In a side bearing, the combination of, a housing, a top cap within said housing and having a plate portion spaced above said housing for frictionally engaging a related part of a railway car, said plate portion completely covering said housing, a sub-cap within said top cap and being arranged to move vertically with said top cap and to move horizontally relative to said top cap, spring means between said sub-cap and housing for moving both caps outwardly of said housing, and spring means between said caps for moving the latter apart into frictional engagement with said housing.

8. In a side bearing, the combination of, a housing, a top cap within said housing and having a plate portion spaced above said housing for frictionally engaging a related part of a railway car, said plate portion completely covering an opening in said housing, a second cap within and beneath said top cap, said second cap being arranged to move vertically with said top cap and horizontally relative to said top cap, coil spring means acting vertically between said housing and second cap for moving both caps outwardly of said housing, and a horizontal coil spring within said top cap for moving both caps apart into frictional engagement with said housing.

9. In a side bearing, the combination of, a housing having a clear access opening defined by side and end walls, a top cap within said housing having a plate positioned above and overlying all of said walls, a bottom cap within said housing and top cap forming a support for said top cap, spring means within said bottom cap for urging both of said caps outwardly of said housing, and a spring within said top cap urging both caps apart and into frictional engagement with said end walls.

10. In a side bearing, the combination of, a housing having a clear access opening defined by side and end walls, a top cap within said housing having a plate positioned above and overlying all of said walls, a downwardly opening bottom cap positioned within and supporting said top cap, vertically acting coil springs acting between said housing and bottom cap for urging both of said caps outwardly of said housing, and a horizontally acting coil spring within said top cap and urging said caps in opposite directions to frictionally engage said housing end.

11. In a side bearing, the combination of, a housing having a clear access opening defined by side and end walls, a top cap within said housing having a plate portion positioned above and completely overlying all of said walls in vertical spaced relation thereto, said top cap being open at one end thereof, a bottom cap positioned within said top cap and opening downwardly thereof, said bottom cap supporting said top cap and being arranged to move horizontally relative thereto, spring means within said bottom cap for lifting both of said caps outwardly of said housing, and a spring interposed between said caps for urging them into frictional contact with said housing; said bottom cap contacting said housing at the open end of said top cap.

12. In a side bearing, the combination of, a housing having a clear access opening defined by side and end walls, a top cap within said housing having a plate portion positioned above and completely overlying all of said walls in vertical spaced relation thereto, said top cap having an open and a closed end, a bottom cap within said top cap and having both ends thereof closed, said caps being arranged to move vertically in unison and horizontally relative to one another, spring means within said bottom cap only for moving both caps outwardly of said housing, and a second spring means arranged to move said bottom cap outwardly of said open end of said top cap and both of said caps into frictional contact with said housing.

13. In a side bearing, the combination of, a housing having a clear access opening defined by side and end walls, a top cap within said housing having a plate portion positioned above and completely overlying all of said walls in vertical spaced relation thereto, said top cap having an open and a closed end, a bottom cap within said top cap and having both ends thereof closed, said caps being arranged to move vertically in unison and horizontally relative to one another, spring means within said bottom cap only for moving both caps outwardly of said housing, and a second spring interposed between adjacent closed ends of said caps for moving said bottom cap outward of said top cap open end and both caps into frictional contact with said housing.

14. In a side bearing, the combination of, a housing having a clear access opening defined by side and end walls, a top cap within said housing having a plate positioned above and overlying all of said walls, a bottom cap within said top cap and housing, said bottom cap having a plate underlying and frictionally engaging said top cap plate throughout a greater portion of the length thereof, horizontally spaced end flanges on said bottom cap, spring means within said bottom cap for urging both caps outwardly of said housing, and spring means between one end flange and said top cap for urging said other end flange and top cap into frictional contact with said housing end walls.

15. In a side bearing, the combination of, a housing having a clear access opening defined by side and end walls, a top cap within said housing having a plate positioned above and overlying all of said walls, said top cap having a downwardly directed flange extending into said housing, a bottom cap having a plate below and frictionally engaging said top cap plate, horizontally spaced end flanges on said bottom cap, spring means between said end flanges for urging both of said caps outwardly of said housing, and spring means acting between one of said end flanges and downwardly directed flange for urging the other of said end flanges and downwardly directed flange into frictional contact with said end walls.

16. In a cap arrangement for use with a side bearing, the combination of, an open bottomed top cap having a closing flange at one end and being open at another end thereof, a lower cap within and directly supporting said top cap, horizontally spaced end flanges on said lower cap, and a spring acting against said closing flange and one of said end flanges for urging said lower cap outwardly of said open end.

17. In a cap arrangement for use with a side bearing, the combination of, an open bottomed top cap having a closing flange at one end and being open at another end thereof, a lower cap within and directly supporting said top cap, spring means within said lower cap for resiliently carrying both of said caps, horizontally spaced end flanges on said lower cap, and a spring acting against said closing flange and one of said end flanges for urging said caps apart horizontally and said lower cap outwardly of said open end.

18. In a cap arrangement for use with a side bearing, the combination of, an open bottomed top cap having a rubbing plate and a closing flange depending therefrom, said top cap being open at one end removed from said closing flange, a sub-cap within said top cap and having a bed plate underlying and directly supporting said rubbing plate, spaced vertical end flanges downstanding from said bed plate, a spring within said sub-cap for resiliently carrying both of said caps, and a spring acting against said closing flange and one of said end flanges for urging said caps in opposite directions and said sub-cap outwardly of said open end.

EMIL H. BLATTNER.

References Cited in the file of this patent

UNITED STATES PATENTS

| Number | Name | Date |
| --- | --- | --- |
| 2,285,140 | Barrows | June 2, 1942 |